Oct. 14, 1969     J. OSTERMAN     3,472,186
COMBINATION REFUSE AND SEWAGE DISPOSAL SYSTEM
Filed May 9, 1968
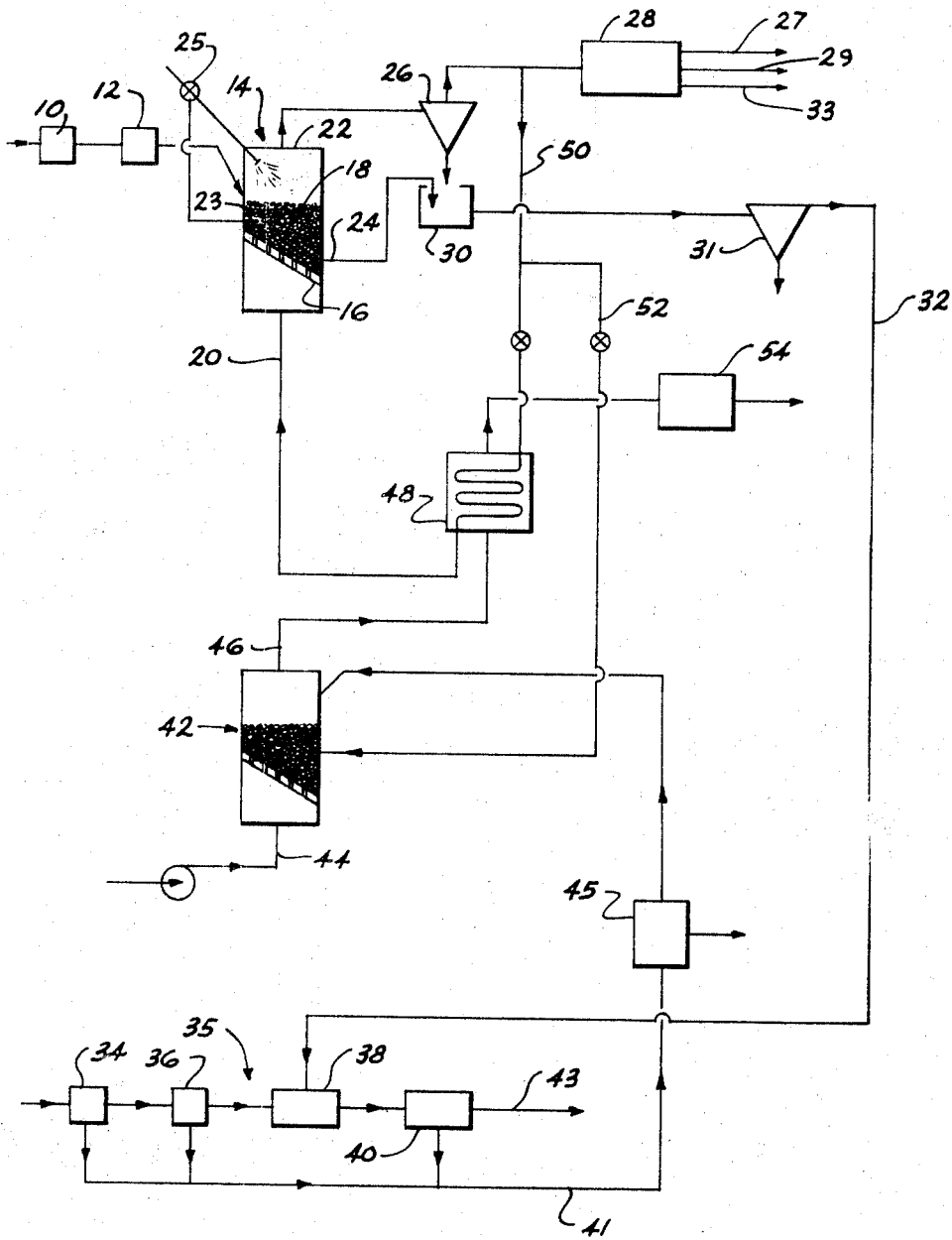
INVENTOR.
JOSEPH OSTERMAN
BY *Robert L Olson*
ATTORNEY

United States Patent Office 3,472,186
Patented Oct. 14, 1969

3,472,186
COMBINATION REFUSE AND SEWAGE DISPOSAL SYSTEM
Joseph Osterman, Simsbury, Conn., assignor to Combustion Engineering, Inc., Windsor, Conn., a corporation of Delaware
Filed May 9, 1968, Ser. No. 727,844
Int. Cl. F23g 3/00, 5/04
U.S. Cl. 110—8                                     4 Claims

ABSTRACT OF THE DISCLOSURE

Apparatus for subjecting garbage or refuse to pyrolysis, thereby producing combustible volatiles and char, conveying the char to sewage treatment apparatus where it is used as an adsorbent to help separate the finely divided and dissolved pollutants from the bulk of the liquid content of the sewage, burning the sewage solids and spent char in a combustion chamber, and using the heat produced in the combustion chamber for the pyrolysis of the refuse.

BACKGROUND OF THE INVENTION

Because of increasing concern over water and land pollution, efficient and economical methods of disposing of refuse and sewage are being sought. It has been proposed to utilize the heat from combustion of refuse for generating steam. However, waterwall incinerators provide low temperature, low pressure steam which often cannot be efficiently used. Regarding sewage, it is known that coal, activated carbon, or char are effective to varying degrees as adsorption materials used in the treatment of sewage. These materials can also be used as filter aids for separating the solids from the effluent. In many areas of the country, it is inconvenient and expensive to use coal or activated carbon for this purpose. As covered in this invention, the char material produced from refuse (which is available wherever sewage treatment is practiced) would act as an adsorbent without the attendant disadvantages of coal or activated carbon.

SUMMARY OF THE INVENTION

In accordance with the invention, refuse is subjected to pyrolysis or decomposition by the action of heat in an agitated reaction chamber. The combustible volatiles that are driven off during this process can be used as a fuel, for example in a steam generator. The remaining solids from the process, in the form of char, can be conveyed to a sewage treatment plant and used as an adsorbent and filter aid in separating the solids from the effluent. After the solids, in the form of a sludge, have been concentrated to a sufficiently high percentage, they are transferred to an incinerator and burned. If an auxiliary fuel is necessary to maintain ignition of the wet sewage sludge, a portion of the combustible volatiles driven off from the refuse can be used for this purpose. The heat released from the combustion of the sewage sludge and char mixture is used for the pyrolysis of the refuse.

BRIEF DESCRIPTION OF THE DRAWINGS

The accompanying drawing is a flow sheet of a combination refuse and sewage disposal system constructed in accordance with the invention.

DESCRIPTION OF THE PREFERRED EMBODIMENT

Looking now to the drawing, refuse it first introduced into separation device 10, where large objects which cannot be easily reduced in size, for example refrigerators, are separated from the rest of the refuse. Noncombustible items, such as cans, can also be separated out at this point. The rest of the refuse moves onto grinding or shredding apparatus 12, where it is reduced to a size which can be easily reacted on in the pyrolysis chamber 14.

The shredded or comminuted refuse is then fed into the fluidized bed chamber 14 where it is agitated and subjected to a decomposing atmosphere by the gaseous fluid flowing upwardly through the bed. The fluidized bed chamber is maintained at approximately 1200° F. and contains an atmosphere with insufficient oxygen to permit combustion so that pyrolysis drives off the combustible volatiles contained in the refuse. These combustible volatiles are exhausted through upper duct 22, flowing to a dry cyclone separator 26, where any solid particles are separated out and discharged into mixing chamber 30 where water is introduced to form a slurry.

The volatiles exiting from the separator 26 then are conveyed to fractionation and condensation apparatus 28. Here the volatiles are broken down, with the gaseous fuel being discharged through line 27. The liquid fuel is discharged through line 29 and the water through line 33. The two fuel fractions can then be transferred to a suitable point of use, for example to a steam generating power plant (not shown).

The solids portion which is not carried out of the fluidized bed chamber 14 by the volatiles can be stripped off through line 24. This char is conveyed to slurry chamber 30, where it is combined with the char discharged from cyclone separator 26.

The particles 18 making up the fluidized bed are supported on a perforated plate 16. The fluid for the fluidized bed is introduced through line 20 into the bottom of the chamber. Since a reducing atmosphere containing little or no oxygen is desired in chamber 14, a good fluid to use is the combustible volatiles being discharged from the upper portion of the chamber. These volatiles, at a point downstream of cyclone separator 26, flow through line 50 to heat exchanger 48, where they are heated prior to their introduction into the fluidized bed.

In order to insure that no combustion takes place in fluidized bed chamber 14 in the event that oxygen somehow enters the chamber, and the temperature climbs above the ignition temperature of the refuse, a temperature sensing probe 23 is positioned in the fluidized bed. When this probe senses a temperature above a predetermined maximum, for example 1300° F., it actuates a valve 25 positioned in a water line, to spray the chamber and thereby reduced the temperature.

The solids slurry, or char slurry contained in mixing chamber 30 flows to a liquid cyclone 31. Here any heavy inerts or metallic members can be removed. The char slurry then flows through line 32 to the sewage treatment apparatus 35.

The sewage treatment apparatus 35 comprises a primary treatment chamber 34, where gross solids are screened out of the entering raw sewage. The sewage next flows to a clarification stage, which may be in the form of a settling tank 36, where additional solids settle out of the effluent. After removal of the settleable solids the sewage is thereafter transferred to a mixing chamber 38, into which the char slurry is also introduced. The char or carbon reacts with the sewage in such a manner as to adsorb the fine particles of sewage solids and dissolved matter remaining after the primary treatment of screening and settling.

The thus treated sewage then flows to a secondary clarification stage 40, which may be another settling tank where the solids settle out and are separated from the effluent. The clear effluent is discharged through line 43.

The separated solids from the various stages of the sewage treatment apparatus are conveyed through line 41. This sewage sludge may have a liquid content running higher than 95%. Thus it is advisable to pass this sludge through a dewatering device 45, which may be a filter, centrifuge or other suitable piece of equipment for removing a sufficient amount of liquid so that the remaining concentrated sludge is capable of being burned. This sludge is then conveyed to a combustion chamber, shown in the drawing in the form of a fluidized bed chamber 42, where it is burned. Air to support combustion of the sewage sludge and to maintain the solids in a fluidized state is supplied through lower inlet line 44. In the event that the sewage sludge contains too much moisture and thus is not capable of maintaining ignition by itself, some of the combustible volatiles may be transported through line 52 to the combustion chamber 42.

The hot combustion gases leave combustion chamber 42 through exhaust duct 46. After these gases give up heat to the combustible volatiles in heat exchanger 48, they pass through gas cleanup apparatus 54, and are then exhausted to atmosphere.

From the above, it can be seen that a system has been provided which will economically and efficiently dispose of both refuse and sewage. By subjecting the refuse to pyrolysis, gaseous and liquid fuels are derived which will be of economic value as fuels which can be burned in a steam generating plant. The char from the pyrolysis chamber can be used in place of other costly chemicals for treating sewage, so as to adsorb and coagulate the solids therein. The sewage sludge is burned in a combustion chamber, with the heat therefrom being used for pyrolysis of the refuse. Thus it can be seen that a number of components have been arranged in a combination where the end products of each can be utilized to advantage in another portion of the over-all system.

While I have shown a preferred embodiment of my invention, it should be understood that various changes can be made thereto without departing from the spirit of the invention. For example, instead of the pyrolysis chamber for the refuse and the combustion chamber for the sewage sludge being in the form of fluidized beds, they could be rotating kilns or other suitable forms of retorts and combustion chambers.

What I claim is:

1. In combination, a pyrolysis chamber, means for supplying the pyrolysis chamber with a solid fuel, means for supplying gas to said pyrolysis chamber in quantities insufficient to support combustion of the solid fuel, first discharge means through which char is discharged from the pyrolysis chamber, second discharge means through which combustible gases are discharged from the pyrolysis chamber, a combustion chamber, sewage treatment apparatus where the solids content of the sewage is separated from the bulk of the liquid content, means for introducing the char discharged from the pyrolysis chamber into the sewage treatment apparatus, means for introducing the separated solids from the sewage treatment apparatus into the combustion chamber for combustion therein, and means for conveying heat from the combustion chamber and transferring it to the gas used in the pyrolysis chamber.

2. The method of disposing of raw sewage and refuse, including the steps of subjecting the refuse to pyrolysis in a pyrolysis chamber with insufficient air and under reduced temperatures such that char and combustible gases are produced, conveying the combustible gases to an ultimate point of use, conveying the char to sewage treatment apparatus and introducing it thereinto, to aid in the treatment of the sewage, separating the solids within the sewage from the effluent, conveying the solids to a combustion chamber for combustion therein, and transferring heat released in the combustion chamber to the pyrolysis chamber.

3. The combination set forth in claim 1, including means for lowering the temperature in the pyrolysis chamber when it exceeds a predetermined maximum.

4. The combination set forth in claim 1, including means for conveying combustible gases being discharged from the pyrolysis chamber to the combustion chamber, to insure continuous ignition of the sewage solids.

References Cited

UNITED STATES PATENTS

| | | | |
|---|---|---|---|
| 2,213,668 | 9/1940 | Dundas et al. | 110—15 |
| 3,304,894 | 2/1967 | Cox et al. | 110—15 |
| 3,351,030 | 11/1967 | Albertson et al. | 110—7 |

KENNETH W. SPRAGUE, Primary Examiner

U.S. Cl. X.R.

110—15